US012288200B2

(12) United States Patent
Singh

(10) Patent No.: US 12,288,200 B2
(45) Date of Patent: Apr. 29, 2025

(54) SMART CONTACT LENS FOR POINT OF SALE ("POS") TRANSACTION VALIDATION USING OBJECT DETECTION AND IMAGE CLASSIFICATION

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 17/577,529

(22) Filed: Jan. 18, 2022

(65) Prior Publication Data

US 2023/0252442 A1 Aug. 10, 2023

(51) Int. Cl.
*G06Q 20/20* (2012.01)
(52) U.S. Cl.
CPC ............................... *G06Q 20/208* (2013.01)
(58) Field of Classification Search
CPC .... G06Q 20/208; G06Q 20/20; G06Q 20/321; G06Q 20/322; G06Q 20/40145; G07F 9/001; G07G 1/0063; G07G 1/0081
See application file for complete search history.

(56) References Cited

U.S. PATENT DOCUMENTS

| 5,351,339 | A | 10/1994 | Reuber et al. |
| 9,503,146 | B1 | 11/2016 | Chen |
| 10,101,599 | B1 | 10/2018 | Greeson |
| 10,247,947 | B2 | 4/2019 | Van Heugten |
| 10,268,888 | B2 * | 4/2019 | Osterhout ............ H04N 23/661 |
| 10,288,902 | B2 | 5/2019 | Liao |
| 10,330,957 | B2 | 6/2019 | Boss et al. |
| 10,353,463 | B2 | 7/2019 | Shtukater |
| 10,359,648 | B2 | 7/2019 | Kim et al. |
| 10,399,291 | B2 | 9/2019 | Hahn et al. |
| 10,588,217 | B2 | 3/2020 | Sun et al. |

(Continued)

OTHER PUBLICATIONS

"Method and System for Smart-Contact-Lens-Based Validation of Receiving Party Before Initiation of Any Transaction", Mar. 2, 2021, <IP.com> (Year: 2021).*

(Continued)

*Primary Examiner* — Fahd A Obeid
*Assistant Examiner* — Jessica E Sullivan
(74) *Attorney, Agent, or Firm* — Weiss & Arons LLP

(57) ABSTRACT

Methods for point of sale ("POS") transaction validation leveraging a smart contact lens is provided. Methods may include pairing the smart contact lens to a POS device. Methods may include identifying, by the smart contact lens, a bounded area upon which purchase items are expected to be placed. Methods may include, in response to detecting a trigger performed by the smart contact lens user, identifying each purchase product placed on the bounded area after the triggering and before a receipt of a stop instruction. Methods may further include storing in a dataset an identifier of each purchase product and the product description of each purchase product. Methods may further include receiving a payload from the POS device including a list of purchase products scanned for purchase at the POS device. Methods may further include verifying an accuracy of the payload prior to completing the transaction.

16 Claims, 7 Drawing Sheets

(56) References Cited

U.S. PATENT DOCUMENTS

| | | |
|---|---|---|
| 10,656,438 B2 | 5/2020 | Liao |
| 10,678,071 B2 | 6/2020 | Boss et al. |
| 10,705,352 B2 | 7/2020 | Greeson |
| 10,732,416 B2 | 8/2020 | Van Heugten |
| 10,754,178 B2 | 8/2020 | Kim et al. |
| 10,823,979 B2 | 11/2020 | Liao |
| 10,845,620 B2 | 11/2020 | Shtukater |
| 10,899,014 B2 | 1/2021 | Du et al. |
| 10,901,505 B1 | 1/2021 | Haine et al. |
| 10,942,369 B2 | 3/2021 | Pinel et al. |
| 10,963,045 B2 | 3/2021 | Weldmariam et al. |
| 2009/0039164 A1* | 2/2009 | Herwig .................... G07G 1/14 235/462.41 |
| 2014/0353501 A1 | 12/2014 | Fantone et al. |
| 2015/0362757 A1 | 12/2015 | Fu |
| 2016/0091737 A1 | 3/2016 | Kim et al. |
| 2016/0246384 A1* | 8/2016 | Mullins .................... G06F 3/017 |
| 2016/0299354 A1* | 10/2016 | Shtukater ................ G02C 7/04 |
| 2016/0324451 A1 | 11/2016 | Young |
| 2017/0023793 A1 | 1/2017 | Shtukater |
| 2017/0046714 A1* | 2/2017 | Van de Velde ......... G06F 21/32 |
| 2017/0116657 A1* | 4/2017 | Oh ...................... G06Q 30/0207 |
| 2017/0169204 A1* | 6/2017 | Fadell .................... G06F 3/0488 |
| 2017/0270636 A1 | 9/2017 | Shtukater |
| 2017/0371184 A1 | 12/2017 | Shtukater |
| 2018/0210235 A1* | 7/2018 | Boss ...................... G02C 11/10 |
| 2018/0224669 A1 | 8/2018 | Shtukater |
| 2018/0260024 A1* | 9/2018 | Maltz .................... G02B 27/017 |
| 2018/0361588 A1 | 12/2018 | Du et al. |
| 2019/0025607 A1 | 1/2019 | Liao |
| 2019/0025608 A1 | 1/2019 | Liao |
| 2019/0025609 A1 | 1/2019 | Liao |
| 2019/0033618 A1 | 1/2019 | Choi et al. |
| 2019/0041663 A1* | 2/2019 | Goldstein ............ G02B 27/017 |
| 2019/0094570 A1 | 3/2019 | Jow et al. |
| 2019/0179165 A1 | 6/2019 | Shtukater |
| 2019/0204625 A1 | 7/2019 | Greeson |
| 2019/0227348 A1 | 7/2019 | Boss et al. |
| 2019/0250432 A1* | 8/2019 | Kim ...................... G02C 11/10 |
| 2019/0282094 A1 | 9/2019 | Lamrani et al. |
| 2019/0293964 A1 | 9/2019 | Takaki et al. |
| 2019/0332168 A1 | 10/2019 | Weldemariam et al. |
| 2019/0385342 A1* | 12/2019 | Freeman ................ G06T 11/00 |
| 2020/0022256 A1 | 1/2020 | Sun et al. |
| 2020/0026097 A1 | 1/2020 | Pinel et al. |
| 2020/0116897 A1 | 4/2020 | Schadlu et al. |
| 2020/0138702 A1 | 5/2020 | Kim et al. |
| 2020/0162698 A1 | 5/2020 | Rakshit et al. |
| 2020/0201074 A1 | 6/2020 | Kim et al. |
| 2020/0319479 A1 | 10/2020 | Hahn et al. |
| 2020/0333637 A1 | 10/2020 | Greeson |
| 2020/0400957 A1 | 12/2020 | Van Heugten |
| 2021/0007643 A1 | 1/2021 | Lamrani et al. |
| 2021/0081952 A1 | 3/2021 | Rakshit |
| 2021/0081953 A1 | 3/2021 | Rakshit |
| 2021/0124415 A1 | 4/2021 | Haine et al. |
| 2021/0232177 A1* | 7/2021 | Adari .................... G06Q 20/321 |
| 2021/0319420 A1* | 10/2021 | Yu ......................... G06V 20/52 |
| 2022/0044305 A1* | 2/2022 | Glaser ................ G06Q 30/0601 |

OTHER PUBLICATIONS

Stein, Scott. "Smart Contact Lenses: You Can Control a MicroLED Display With a Flick of Your Eyes", Apr. 2, 2022, <CNET.com> ( Year: 2022).*

"Eye Tracking," https://en.wikipedia.org/wiki/Eye_tracking, Wikimedia Foundation, Inc., Jun. 8, 2021.

"LiFi-What It Is, How It Works, What It Provides, How to Apply, and Its Future Prospects," https://www.led-professional.com/resources-1/articles/lift-what-it-is-how-it-works-what-it-provides-how-to-apply-and-its-future-prospects, LED Professional, Jan. 15, 2018.

Hiren, "Global Smart Contact Lenses Market: Industry Analysis and Forecast (2021-2027)—by Type, Application and Region," https://ksusentinel.com/2021/04/14/global-smart-contact-lenses-market-industry-analysis-and-forecast-2021-2027-by-type-application-and-region/ Apr. 14, 2021.

"This is Eye Tracking," https://www.tobii.com/group/abou is-is-eye-tracking/, Tobii AB, Retrieved on Jun. 29, 2021.

"LiFi," https://en.wikipedia.org/wiki/Li-fi, Wikimedia Foundation, Inc., Jun. 25, 2021.

"Sony's Smart Contact Lens Will Blow Your Mind Away!" https://medium.com/chip-monks/sonys-smart-contact-lens-will-blow-your-mind-away-30813d6da687, Chip-Monks, Jul. 5, 2017.

* cited by examiner

SMART CONTACT LENS FOR POINT OF SALE ("POS") TRANSACTION VALIDATION USING OBJECT DETECTION AND IMAGE CLASSIFICATION

FIELD OF TECHNOLOGY

Aspects of the disclosure relate to providing apparatus and methods for use with smart contact lenses. In particular, the disclosure relates to apparatus and methods for using smart contact lenses in performing transactions.

BACKGROUND OF THE DISCLOSURE

Smart contact lenses may be defined as wearable contact lenses that include both hardware and software components. Smart contact lenses may adopt the structure of a conventional pair of contact lenses. Smart contact lenses may also include a microprocessor embedded in the smart contact lens that may provide processing capabilities including tracking user eye movements and executing actions based on the eye movements.

Customers, when checking out their products for purchase at a checkout counter, want to ensure that each product is accurately scanned and priced at the POS device. However, customers do not typically double check for accuracy. This may be due to lack of time and/or pressure from the line of customers behind him.

It would be desirable, therefore, to provide systems and methods that leverage smart contact lens capabilities to ensure accuracy of a transaction performed at the POS device. It would be further desirable to leverage smart contact lens capabilities to complete the transaction at the POS device.

SUMMARY OF THE DISCLOSURE

Apparatus and methods for point of sale ("POS") transaction validation is provided. The transaction validation may leverage a smart contact lens positioned on an eye of a user.

The method may include pairing the smart contact lens to a POS device when the smart contact lens is within a pre-determined proximity to the POS device.

The method may further include identifying, by the smart contact lens, a bounded area upon which purchase items are expected to be placed. The bounded area may be within close proximity to the POS device. The bounded area may be connected to the POS device.

The method may further include detecting a trigger performed by the user. The trigger may be a body gesture. The trigger may be a wave of the hand, swipe of the finger, deliberate eye blink gesture or any other suitable body gesture detected by the smart contact lens.

In response to the detecting, the method may include identifying by the smart contact lens, using an object detection algorithm, each purchase product placed on the bounded area. The detecting may be performed after the triggering and before a receipt of a stop instruction. The identifying of each purchase product may include retrieving a product description associated with each purchase product.

The method may further include storing, on the smart contact lens, an identifier of each purchase product and the product description of each purchase product in a dataset.

The method may further include receiving, at the smart contact lens, a payload from the POS device. The payload may include a list of purchase products. The purchase products may be scanned for purchase at the POS device. In some embodiments, each purchase product may include a list including a name of each purchase product. The list may also include a brand of each purchase product.

In response to a receipt of the payload, the method may include verifying, at the smart contact lens, an accuracy of the payload prior to completing the transaction. The verifying may include determining if each purchase product included in the payload is identified in the dataset.

When the payload includes a purchase product not identified in the dataset, the method may include transmitting a first instruction to the POS device from the smart contact lens. The first instruction instructing the POS device to pause the transaction.

When the payload includes each purchase product identified in the dataset, the method may include transmitting a second instruction to the POS device. The second instruction instructing the POS device to complete the transaction.

In some embodiments, when the payload includes each purchase product identified in the dataset, the method may further include triggering an augmented reality display on the smart contact lens to display a selectable option button to initiate a transaction. The method may further include, detecting a selection of the selected option button and transmitting the second instruction to the POS device instructing the POS device to complete the transaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
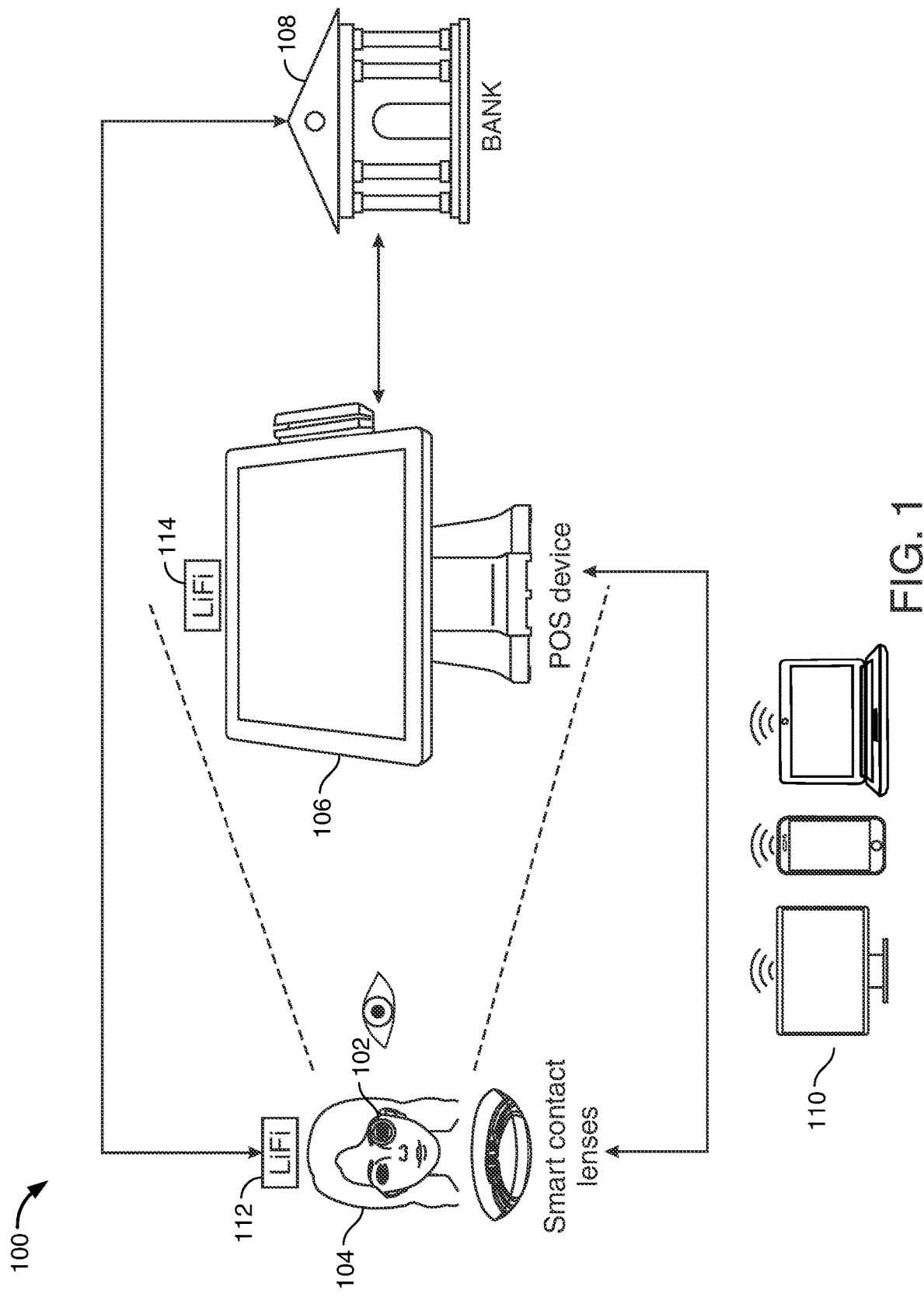
FIG. 1 shows an illustrative system in accordance with principles of the disclosure.

A system using smart contact lens interactions for point of sale ("POS") transaction validation is provided. The system may include a smart contact lens device. The smart contact lens device may be configured to be positioned on an eye of a user. The smart contact lens may include a micro camera, one or more sensors, a light fidelity ("Lifi") emitter, a Lifi receptor and a microprocessor.

The system may also include a POS device. The POS device may include a processor, scanning device and a graphical user interface ("GUI") on a display of the POS device. The POS device may be located at a retail location. The POS device may be supported by the retail location. The POS device may be in electronic communication with one or more payment processing networks such as Visa™, Mastercard™ etc, associated with the retail system. The retail system may be associated with a merchant and/or entity.

For the purposes of this disclosure, the smart contact lens device, referred to alternately herein as a "smart contact lens", may be understood to mean wearable contact lenses with one or more internal processors. The one or more internal processors may include one or more microprocessors. In addition to the processors, the smart contact lens may also include hardware components associated with conventional contact lenses such as soft and pliable hydrophilic plastic.

In some embodiments, the smart contact lens may be a first smart contact lens on a first eye. The system may also include a second smart contact lens on a second eye. The two smart contact lenses may be a pair of smart contact lenses.

The smart contact lens may include a micro camera. The micro camera may be operable to capture data from within a visual field of view of the user's eye(s).

The smart contact lens may include a memory unit. The memory unit may be for storing captured data and data transmitted from other devices.

The smart contact lens may include one or more sensors. The sensors may be configured to capture a user's point of focus. Sensors may include the camera. Sensors may also include piezoelectric sensors, infrared sensor and/or an acceleration sensor. These micro electronic sensors may be configured to measure changes in pressure, acceleration and force. The smart contact lens may be configured to use the measurement and translate them into control instructions.

In some embodiments, the smart contact lens may include near-field communication ("NFC") capabilities. The smart contact lens may be a near-field communication ("NFC") powered device. The POS device may be an NFC powered device. In some embodiments, the POS device may be a communication terminal.

The distance that may enable a communication between the smart contact lens and the POS device may be within the NFC enabled communication ranges. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

The smart contact lens may include an antenna. The antenna may be a loop antenna. The antenna may be configured to enable radio frequency communication. The antenna may extend the range of NFC to 20 centimeters.

In some embodiments, the smart contact lens may include light fidelity ("Lifi") capabilities. The communication between the smart contact lens and the POS device may be enabled via Lifi. The smart contact lens may include a Lifi receptor for receiving data and a Lifi emitter for transmitting data.

The smart contact lens may include a light emitting diode ("LED"). The LED may be attached to a substrate on the smart contact lens. The LED may be connected to a microcontroller and/or a microprocessor. The LED may be operable to transmit data captured to the POS device. The LED may be operable to transmit data to any one or more additional computing devices.

Lifi is a two-way network protocol for high speed connectivity using light technology. LiFi is a light-based communication system capable of transmitting data wirelessly at high speed using light emitting diodes (LEDs). The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream.

In some embodiments, LED bulbs may be dimmed to levels below human visibility while still emitting enough light to carry data. The transmission speed of LiFi may enable transfers at a very fast speed.

LiFi may use the visible light spectrum which is very large and is therefore not limited by spectrum capacity.

LiFi is able to deliver consistent large data transfers. Additionally, LiFi frequencies may be used in electromagnetic sensitive areas without causing interference. LiFi infrastructure may be relatively simple and may not require the use of radio transmitters and antennas.

The limited hardware required for LiFi communications may also improve energy efficiency.

The smart contact lens may be exposed to light, mechanical movement of blinking and electromagnetic conduction and may harvest energy from these sources.

The microprocessor embedded in the smart contact lens may be operable to capture, store and transmit data to the POS device.

One or more software modules may execute on the processors. The one or more software modules may be stored in a memory located within the smart contact lens. The one or more software modules may, in the alternative, be referred to as applications. The applications may enable the smart contact lens to execute various tasks.

The microprocessor may execute an eye movement tracking application. The eye movement tracking application may execute an eye tracker application. Sensors may be controlled by the eye tracking application executed on the smart contact lenses microprocessor. Eye position data detected by the sensors may be collected by the eye tracking application. Eye position data detected by the sensors may be stored in a memory embedded in the smart contact lenses. Sensors for tracking user eye position may include cameras. In some embodiments, the cameras may be combined with illuminators. The illuminators may include a near infrared light source or any suitable light source.

One method of tracking user eye position involves pupil center corneal reflection (PCCR). PCCR is a method for remote, non-intrusive eye tracking. A light source illuminates the eye causing visible reflections and a camera captures an image of the reflections. A vector is calculated based on the angle between the cornea and pupil reflections. The direction of the vector combined with other geometrical features of the reflections may be used to determine eye position. Eye position may include gaze direction.

In some embodiments, the smart contact lenses may include multiple cameras per eye for increased accuracy in measuring gaze direction. The smart contact lens may include accelerometer, gyroscope and magnetometer sensors in order to provide differentiation between head and eye movements. The smart contact lens may include slippage compensation and persistent calibration to enable integrating the smart contact lenses with the development platform and may enable a user to develop applications in a hands-free manner.

In some embodiments, the POS transaction validation may be performed by a smart glasses or any other suitable smart mobile device. The smart glasses may include Lifi capabilities and may be enabled to pair to the POS device for communication.

The system may include an item verification application executed by the microprocessor on the smart contact lens. The item verification application may be configured to, upon execution, identify a bounded area upon which purchase products are expected to be placed. The item verification application may be executed alongside the eye tracker application. One example of the application may involve the following use case. The identification of the bounded area may be identified when the user's focus is detected to be focusing on the bounded area.

In response to a detection of a trigger by the user, the item verification application may be configured to identify each purchase product placed within the bounded area. The identifying may be enabled using an object detection algorithm. As each purchase product is being placed in the bounded area, the microprocessor may be configured to execute the item verification application to identify the purchase product. The identifying may be continuously performed until receipt of a stop instruction or until a pre-determined time. The stop instruction may be a hand gesture. The pre-determined time may be an amount of time where activity is not detected within the bounded area. For example, if the smart contact lens does not detect any purchase products for ten seconds, the smart contact lens may be configured to stop the identifying. In some embodiments, the identifying of each purchase product may also include retrieving a product description associated with each purchase product.

The trigger may be detected when a deliberate double eye blink gesture is performed by the user while focusing on the purchase products within the bounded area. The trigger may be detected when a hand gesture is performed by the user i.e. —a wave of the hand.

The trigger may be a virtual touch on a selectable option button displayed on an augmented reality display of the smart contact lens. The selectable option button may display 'start.' The trigger may be detected upon selection of the selectable option button by a touch of the finger.

In some embodiments, the bounded area may be within the confines of a checkout conveyor belt. The bounded area may be within the borders of the conveyor belt. The bounded area may include two fixed sides. The bounded area may include three fixed sides. The three fixed sides may be two sides of the conveyer belt and the POS device. The bounded area may include four sides. The fourth side may be a fixed side. The fourth side may be the end of the checkout counter conveyer belt. The fourth side may be portable. The fourth side may be a portable marker. The portable marker may be placed on the checkout counter conveyer belt after the smart contact lens user completes placing purchase products down on the conveyor belt. The portable marker may be an electronic portable marker.

In some embodiments, the bounded area may be a three-dimensional area that includes, as a boundary, one, two, three or four sides of the checkout conveyer belt and/or a vertical height from the conveyor belt. The vertical height is preferably within the length and width of the bounded area on the conveyor belt, but other space-defining arrangements are possible and within the scope of the invention.

The bounded area may be identified at the smart contact lens. The item verification application may be configured to identify objects that are within the confines of the bounded area and to black-out all of the surrounding areas. The surrounding areas may be all areas outside the bounded area. The surrounding areas may include items that are placed on shelves behind the checkout conveyor belt. The surrounding areas may include items placed on the checkout conveyor belt after the portable marker such as items belonging to a different purchaser.

In some embodiments, the bounded area may be within the confines of a shopping cart or shopping basket.

The processing may include using cognitive capabilities of the smart contact lens to classify and identify each purchase product. The cognitive capabilities may also enable counting the purchase products. The cognitive capabilities may include using image detection and image classification artificial intelligence ("AI") and machine learning ("ML") algorithms or any other suitable algorithms.

The smart contact lens may execute an object detection algorithm. The object detection algorithm may be a Self-Attention Generative Adversarial Network ("SA GAN"). The object detection algorithm may detect objects. When the smart contact lens user is in the process of purchasing products, the object detection algorithm may detect objects having relevance to purchase products. Objects that are not of relevance, and thus not detectable by the object detection algorithm, may include objects that are not typically purchased. Additionally, the object detection algorithm is configured for detecting objects within the confines of a defined bounded area and may discard objects outside the bounded area.

Following a detection of each object, an image classification algorithm may be executed to classify what each object is. The classification may classify the actual purchase product. A name of the purchase product may be classified. A brand of the purchase product may be classified. A size of the purchase product may also be classified.

Upon identification of each purchase product, an identifier of each purchase product and the product description of each purchase product may be stored in a dataset at the smart contact lens.

In some embodiments, the item verification application may be configured to identify each purchase product when a hand of the smart contact lens user is grasping the purchase product and when it is located within the bounded area and/or moving through the bounded area. The system may be able to authenticate the hand as being the smart contact lens user's hand based on biometric characteristics of the hand of the user stored at the smart contact lens. By identifying a purchase product while in the hands of the user, this may enable a more accurate dataset. Because checkout counters are accompanied very often with rows of shelves containing additional items that are available for purchase, in order to eliminate the item verification application from detecting those additional items, the system may detect the hand of the user accompanying the purchase products.

In some embodiments, the item verification application is further configured to, following the identification of each purchase product, instruct the display to display an augmented reality display of each purchase product and circumscribe each purchase product with a boundary box.

Following a completion of identification of each purchase product being purchased by the user, the smart contact lens may detect a stop instruction. The stop instruction may include a user gesture performed within the visual field of view of the user. The user gesture may be a hand gesture including a wave of the hand and/or a swipe of the finger. In some embodiments, the stop instruction may include an identification of the physical divider being placed on the conveyor belt after placement of purchase products.

The system may also include a smart contact lens pairing application. The smart contact lens pairing application, when executed by the microprocessor on the smart contact lens, may be configured to pair the smart contact lens to the POS device. The pairing may enable the smart contact lens to send data to the POS device and receive data from the POS device securely. The pairing may also enable the POS device to send data to the smart contact lens and receive data from the smart contact lens securely. The pairing may occur when the smart contact lens is within a pre-determined proximity to the POS device. The pre-determined proximity may be a proximity that enables a secure wireless communication between the POS device and the smart contact lens. The wireless communication may be via NFC, Lifi or any other suitable wireless communication.

In some embodiments, the pairing may include, when the smart contact lens is within the pre-determined proximity to the POS device, generating a token via the pairing application. The token may be derived from a biometric profile of the user stored on the smart contact lens. The token may be transmitted, via the Lifi emitter on the smart contact lens, to the POS device. The pairing may further include, displaying on the GUI, profile data of the user based on the token and displaying a selectable option button wherein upon selection enables a pairing of the smart contact lens to the POS device. The pairing may also include selecting the selectable option button at the POS device thereby automatically pairing the devices.

In some embodiments, the pairing may include a multi-factor authentication of the user. The pairing may be enabled via the POS device. The pairing may be enabled when the smart contact lens is within the pre-determined proximity to the POS device.

The pairing may include, receiving a token at the smart contact lens from the POS device. The token may be a password. The pairing may include displaying the token on an augmented reality display on the smart contact lens. Following the displaying, the pairing may include inputting the token into a mobile application on a mobile device of the user.

It should be appreciated that the mobile device may also be within the pre-determined proximity to the POS device in order to receive the token. In response to the inputting of the token into the mobile application, the pairing may include transmitting the token from the mobile application to the POS device. The pairing may further include confirming, at the POS device, the smart contact lens, mobile device and token being associated with a user-profile of the user of the smart contact lens.

In some embodiments the pairing may include identifying, by the POS device, a device identification associated with the smart contact lens. The device identification may be an identification number. The pairing may also include performing, by the POS device, an iris recognition scan on an iris of the user to determine iris properties of the user. The pairing may further include confirming the device identification and the iris properties correspond to device identification and iris properties stored in the user-profile associated with the user at the POS device.

Because the pairing may authenticate the user and enable the user to perform one or more transactions with the POS device, the user may not need to insert any form of a card for identification and authorization. When either one or both of the devices identification and the iris properties do not correspond to the stored device identification and the stored iris properties, the method may include disabling the performing of the one or more transactions at the POS device. The disabling may include displaying an error message on the GUI. The disabling may further include disabling selectable option buttons on the display from being selectable.

In some embodiments, the pairing may occur automatically when the smart contact lens user enters the retail store. The retail system associated with the store may automatically detect the smart contact lens user based on user biometric characteristics stored in a user profile within the retail system.

The system may also include a POS transaction payload application. The POS transaction payload application may be executed at the POS device. The POS transaction payload application may be configured to, following a scanning of each purchase product by the POS device, compile a payload. The payload may include a list of the purchase products scanned at the POS device. Each purchase product may include a name of the purchase product. Each purchase product may also include, in some embodiments, a brand of the purchase product, a total count of the purchase product, a cost of the purchase product, and barcode information.

Following the compiling of the payload, the POS transaction payload application may be configured to transmit the payload, via a Lifi emitter on the POS device, to the smart contact lens.

In response to a receipt of the payload, the microprocessor is configured to execute the item verification application to verify an accuracy of the payload prior to completing a transaction. The verifying may include determining if each purchase product included in the payload is identified in the dataset.

When the payload includes a purchase product not identified in the dataset this may be an indication of an anomaly in the payload. The microprocessor is configured to transmit a first instruction to the POS device to pause the transaction. When the dataset does not include one or more purchase products identified in the payload, this may indicate an error in the payload. This may occur when a purchase product is charged two times for one product.

In some embodiments, when an anomaly is identified in the payload, the smart contact lens may be configured to instruct the display to trigger the augmented reality display of an alert message indicating an anomaly in the payload. Following the displaying, the smart contact lens may transmit the first instruction to the POS device.

In response to a receipt of the first instruction at the POS device, the POS device may display an alert message on the GUI. The alert message may notify a cashier at the POS device to verify the payload.

When the payload includes each purchase product identified in the dataset, the microprocessor is configured to receive an instruction to complete the transaction.

In some embodiments, smart contact lens user may select on the augmented reality display, a method of payment. The method of payment may be one of a plurality of smart cards displayed on the augmented reality display. The smart card information may be transmitted to the POS device for completing the transaction.

In some embodiments, the smart card may be manually swiped at the POS device to complete the transaction.

In some embodiments, because the smart contact lens and the POS device are paired, smart card information for completing the transaction may be automatically transmitted to the POS device when the payload is verified.

In some embodiments, prior to completing the transaction, smart contact lens may be enabled to search for electronic coupons that may apply to any one or more of the purchase products. In response to a retrieval of one or more electronic coupons, transmitting the electronic coupons to the POS device for processing. Electronic coupons may be stored at the smart contact lens. Electronic coupons may be retrieved from the internet via a mobile device paired to the smart contact lens.

A system using smart contact lens interactions for processing a transaction is provided. The system may include a smart contact lens configured to be positioned on an eye of a user. The smart contact lens may include a micro camera, one or more sensors, a light fidelity ("Lifi") emitter, a Lifi receptor and a microprocessor.

The system may also include a POS device. The POS device may include a processor, scanning device and a graphical user interface ("GUI") on a display of the POS device.

The system may also include an item verification application. The item verification application, when executed by the microprocessor on the smart contact lens, may be configured to identify a bounded area in which purchase products are expected to be temporarily located. The bounded area may have a length, width and depth. The bounded area may be a three-dimensional area within a hand of the smart contact lens user. The purchase product may be detected when the purchase product is within a visual field of interest of the user and within the bounded area.

The item verification application may be configured to identify each purchase product when each purchase product is within the bounded area. The identification may be enabled using an object detection algorithm. The identifying of each purchase product may include retrieving a product description associated with each purchase product. The product description may be identified using image classification.

The item verification application may be configured store an identifier of each purchase product and the product description of each purchase product in a dataset. The dataset may be stored at the smart contact lens database.

The system may also include a smart contact lens pairing application. The smart contact lens pairing application, when executed by the microprocessor on the smart contact lens, may be configured to pair the smart contact lens to the POS device. The pairing may be enabled when the smart contact lens is within a pre-determined proximity to the POS device. The pairing may enable a secure wireless communication between the POS device and the smart contact lens.

The microprocessor, in response to the pairing, may be configured to transmit the dataset to the POS device. The POS device may be configured to, upon receipt of the dataset, process the dataset by tagging each purchase product with a cost of the purchase product.

The POS device may be further configured to generate an invoice based on the cost tagged to each purchase product.

Following the generating of the invoice, the POS device may be configured to transmit an instruction to the smart contact lens requesting a receipt of a confirmation to complete the transaction.

The receipt of the confirmation may be received via a selection of a selectable option button on the augmented reality display of the smart contact lens, the selectable option button confirming the completion of the transaction. In response to the selection, the smart contact lens may be configured to transmit transaction data to the POS device. The transaction data may include a method of payment for the transaction.

In some embodiments, the smart contact lens may automatically pair with a retail system when the smart contact lens user enters the actual store associated with the retail system. The retail system may authenticate the smart contact lens user based on biometric characteristics of the smart contact lens user stored within the retail system. When the smart contact lens is paired upon entry to the store, the product description of each purchase product detected, may be retrieved from a database associated with the retail system. The smart contact lens may have access to the database once the smart contact lens is paired to the POS device and/or to the retail system. In this embodiment, when the smart contact lens is within pre-determined proximity to the POS device, the POS device may receive the dataset and generate the invoice. The POS device may be further configured to receive transaction data from the smart contact lens to complete the transaction.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart contact lens 102, smart contact lens 202, smart contact lens 302, smart contact lens 402, smart contact lens 512 and smart contact lens 604 may have one or more features in common with the smart contact lens described herein. Additionally, features of smart contact lens described in connection with FIGS. 1-6 may be included in the smart contact lens described herein.

FIG. 1 shows an illustrative system 100 in accordance with principles of the invention. Smart contact lens 102 may be positioned on an eye of user 104. Smart contact lens 102 may be in electronic communication with the POS device 106.

Smart contact lens 102 may, in some embodiments, be in electronic communication with one or more mobile devices 110 associated with user 104.

Smart contact lens 102 may include Lifi capabilities. The Lifi capabilities may include a Lifi emitter and a Lifi receiver. The POS device may also include a Lifi emitter and a Lifi receiver. The wireless communication between the smart contact lens 102 and the POS device 106 may be enabled via Lifi.

The communication between the smart contact lens 102 and the POS device 106 may be initiated following a pairing of the smart contact lens with the POS device. When smart contact lens 102 is within a pre-determined proximity to the POS device, the smart contact lens 102 may automatically pair with the POS device. The pre-determined proximity may be a proximity between the smart contact lens and the POS device that enables a wireless communication.

In some embodiments smart contact lens 102 may pair directly with POS device 106. In some embodiments, smart contact lens 102 may use one of mobile devices 110 for initiating the pairing.

The wireless communication may be enabled via NFC, Lifi, Bluetooth, Wifi or any other suitable mode. The POS device may authenticate the user of the smart contact lens by authenticating both the smart contact lens and the mobile device. In some embodiments, the POS device may authenticate the user only via the smart contact lens.

Once the smart contact lens 102 is in communication with the POS device 106, the user 104 may be enabled to initiate and complete a transaction at the POS device via the smart contact lens. When completing the transaction, POS device 106 may communicate with a financial platform 108 for verification and completion of the transaction.

Smart contact lens may include one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

It should be appreciated that edge computing may enable the smart contact lens to perform all the functions and methods disclosed herewith. When run on the smart contact lens, each hardware may be a micro version. Processors, receivers, transmitters, sensors and cameras and any other suitable hardware may be micro.

The smart contact lens and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include a speaker for providing audio output and/or a video display for providing textual, audiovisual and/or graphical output.

Software applications executed by the smart contact lens and the remote server may be stored within the non-transitory memory and/or other storage medium. Software applications may provide instructions to the processor that enable the apparatus to perform various functions. The instructions may include any of the smart contact lens methods and processes described herein. For example, the non-transitory memory may store software applications such as the item verification application and the smart contact lens pairing application. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart contact lens and the remote server may be part of two or more networks. The smart contact lens and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart contact lens and the remote server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards.

Figure 2:
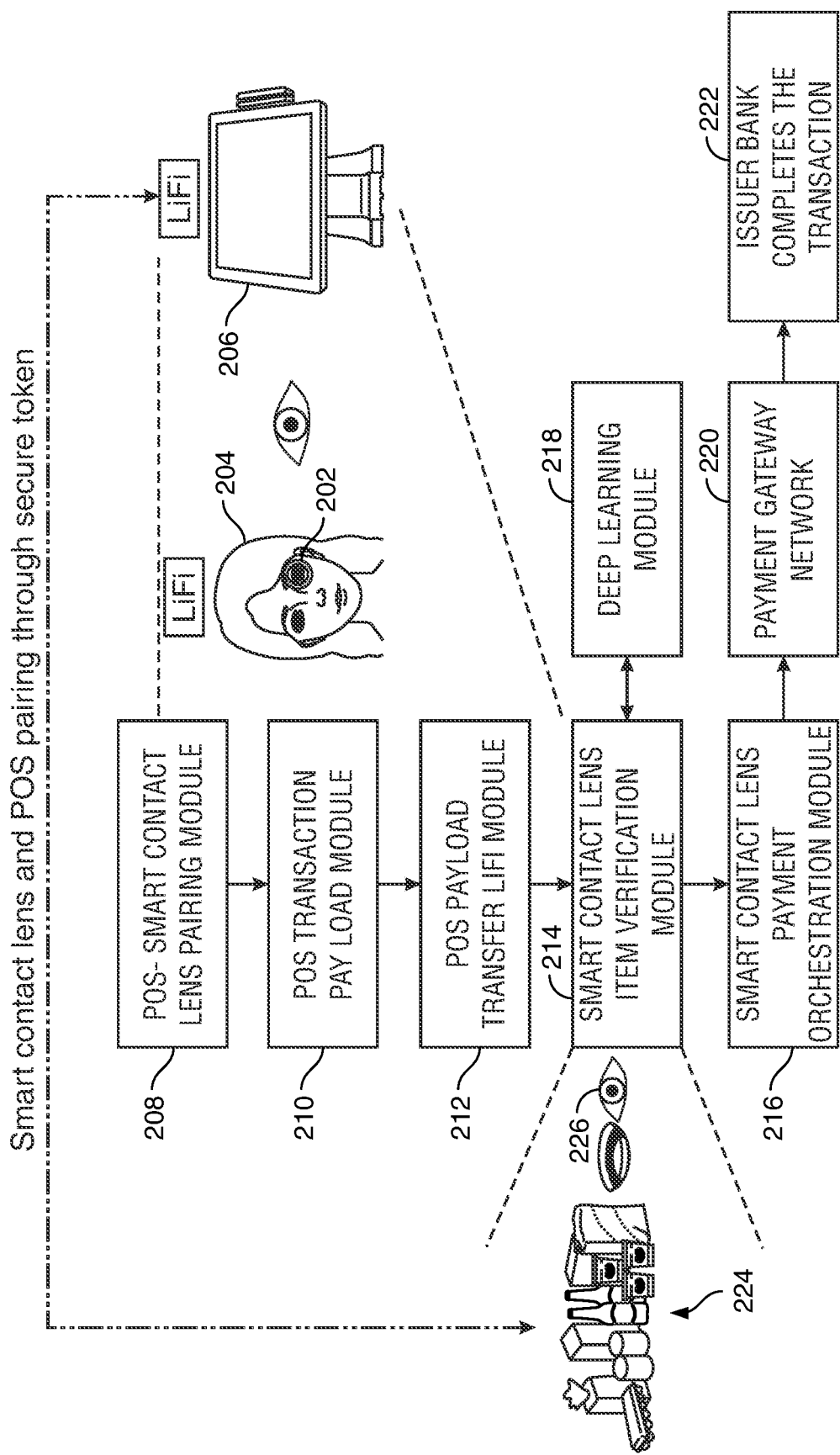
FIG. 2 shows an illustrative diagram in accordance with principles of the disclosure.

FIG. 2 shows an illustrative diagram 200 of systems and methods in accordance with principles of the disclosure. In FIG. 2, smart contact lens 202 is shown to be positioned on smart contact lens user 204. Smart contact lens 202 is shown as being in communication with POS device 206. Smart contact lens 202 is also shown capturing purchase products 224.

The illustrative methods in FIG. 2 include POS-Smart contact lens pairing module 208, which upon execution, enables a pairing of the smart contact lens 202 and the POS device 206. A secure token may be transmitted from the smart contact lens 202 to the POS device 206. POS device 206 may receive the token and authenticate the user of the smart contact lens. The methods may further include executing a POS transaction payload module 210 at the POS device 206 to compile a payload. The payload may include data associated with purchase products scanned at the POS device. The payload may include a list of each purchase product and additional product information.

The illustrative methods may further include executing a POS payload transfer Lifi module 212 to transfer the payload to the smart contact lens for verification.

Upon receipt of the payload at the smart contact lens 202, methods may further include executing a smart contact lens item verification module 214 at the smart contact lens to verify each purchase product included in the payload. Purchase products 224 are the actual items the user 204 is purchasing.

Item verification module 214 when executed, using an object detection algorithm, detects each purchase product that is within a bounded area. The detection may be performed via smart contact lens 226. The object detection algorithm may include a deep learning module 218. Following detecting a purchase product, an identification of the purchase product may be stored in a dataset. As each purchase product is detected, the identification is added to the dataset.

In some embodiments, the detecting of each purchase product is performed prior to pairing the smart contact lens to the POS device 206. In some embodiments, the detecting of each purchase product is performed after receiving the payload from the POS device 206.

The illustrative methods may further include executing further the smart contact lens item verification module to compare each purchase product listed in the payload to the identifiers of each detected purchase product included in the dataset.

Upon verification that each purchase product in the payload is identified in the dataset, illustrative methods may further include executing a smart contact lens payment orchestration module 216 to identify and receive transaction information, transmit the transaction information to the payment gateway network 220 and further transmit the transaction information to an issuer bank 222 to complete the transaction.

Figure 3:
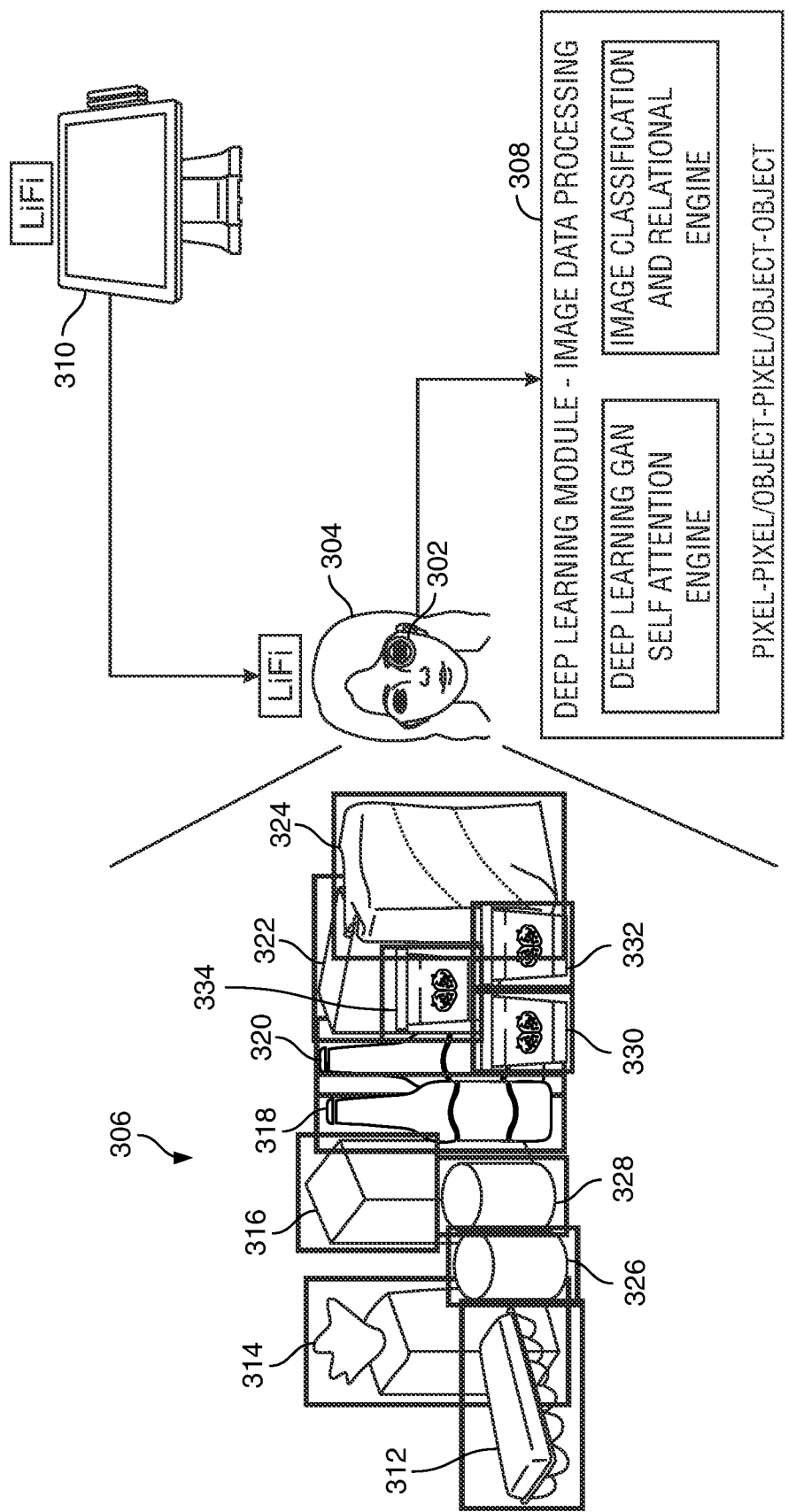
FIG. 3 shows an illustrative diagram in accordance with principles of the disclosure.

FIG. 3 shows an illustrative diagram 300 in accordance with principles of the disclosure. In FIG. 3, smart contact lens user 304 is shown wearing smart contact lens 302. Smart contact lens user 304 may be paired to POS device 310 for processing the transaction.

View 306 represents a view of smart contact lens user 304 through smart contact lens 302. In FIG. 3, image 306 is an augmented reality display. The augmented reality display includes each of purchase products 312, 314, 316, 318, 320 322, 324, 326, 328, 330, 332 and 334. The purchase products may be within the bounded area. The bounded area may be a checkout conveyor belt which are part of the physical reality surrounding smart contact lens user 304. The bounded area may be a shopping cart or shopping basket. The augmented reality display also includes a boundary surrounding each purchase product. The boundaries are not part of the physical reality surrounding smart contact lens user 304. Instead, the boundaries are overlaid on the view of smart contact lens user 304 by a display embedded in smart contact lens 302.

Smart contact lens 302 may view the bounded area and the item verification module may use a deep learning module 308 to detect each purchase product within the bounded area, identify the type of purchase product and the name of the purchase product. The detection may be performed using an object detection algorithm and deep learning i.e. —Self-Attention Generative Adversarial Network ("SA GAN"). Additionally, the identification of the purchase product may be identified using image classification and image data processing.

Figure 4:
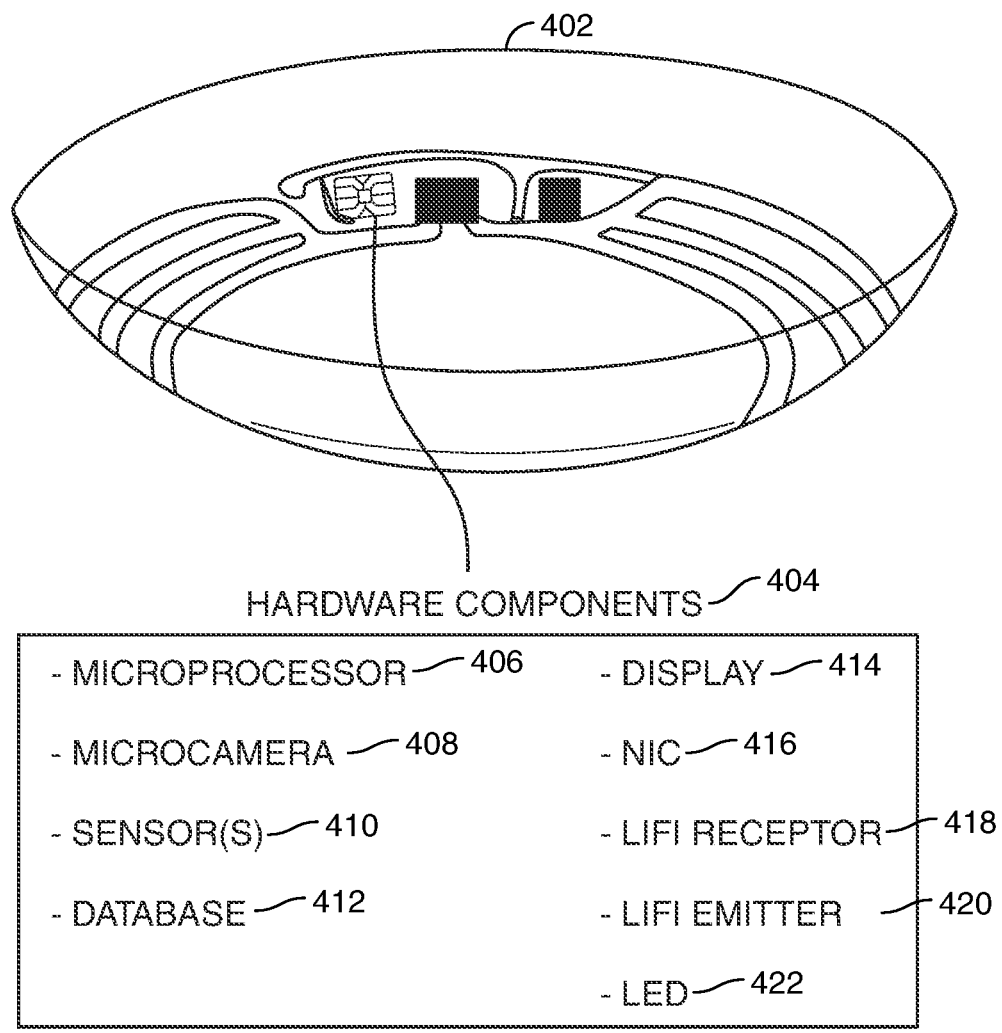
FIG. 4 shows illustrative apparatus in accordance with principles of the disclosure.

FIG. 4 shows illustrative smart contact lens 402 in accordance with principles of the disclosure. Illustrative smart contact lens 402 may include hardware components embedded in smart contact lens 402. The hardware components may include one, two, some, or all of hardware components 404 illustrated in FIG. 4, and, in some embodiments, additional hardware components not included in FIG. 4 but described herein. The hardware components may have functionalities described herein.

Hardware components may include a microprocessor 406. Microprocessor 406 may execute processing within smart contact lens 402.

Hardware components may include a micro camera 408. Micro camera 408 may be operable to capture images. Each image may be an image of one of the purchase products. The microprocessor 406 may be operable to process the image using an object detection algorithm. Micro camera 408 may be operable to record a video. The video may record the view of smart contact lens 402. The video may be stored in database 412. The video may be streamed to a remote server and not stored in database 412. The video may include multiple frames.

Hardware components may include sensors 410. Sensors 410 may include additional cameras for smart contact lenses may to include multiple cameras per eye for increased accuracy in measuring gaze direction. The smart contact lens may include accelerometer, gyroscope and magnetometer sensors in order to provide differentiation between head and eye movements. This may enable an eye tracker application to have an accurate capture of a point of focus of the user's eye.

Hardware components may include database 412. Database 412 may store data such as the dataset generated by the smart contact lens and additional data transmitted by the POS device to the smart contact lens 402.

Hardware components may include display 414. Display 414 may display software-based displays to the user, such as augmented reality displays.

Hardware components may include nano wireless network interface card 416. Nano wireless NIC 416 may establish communication with a nearby wireless network. The wireless network may be used to communicate with the remote server.

Hardware components may include Lifi receptor 418. Lifi receptor may be operable to receive data transmitted via a Lifi emitter at the POS device. Lifi receptor 418 may leverage LED 422 for reception.

Hardware components may include Lifi emitter 420. Lifi emitter 420 may be operable to transmit data to the POS device. Lifi emitter 420 may also leverage LED 422 for transmission.

Figure 5:
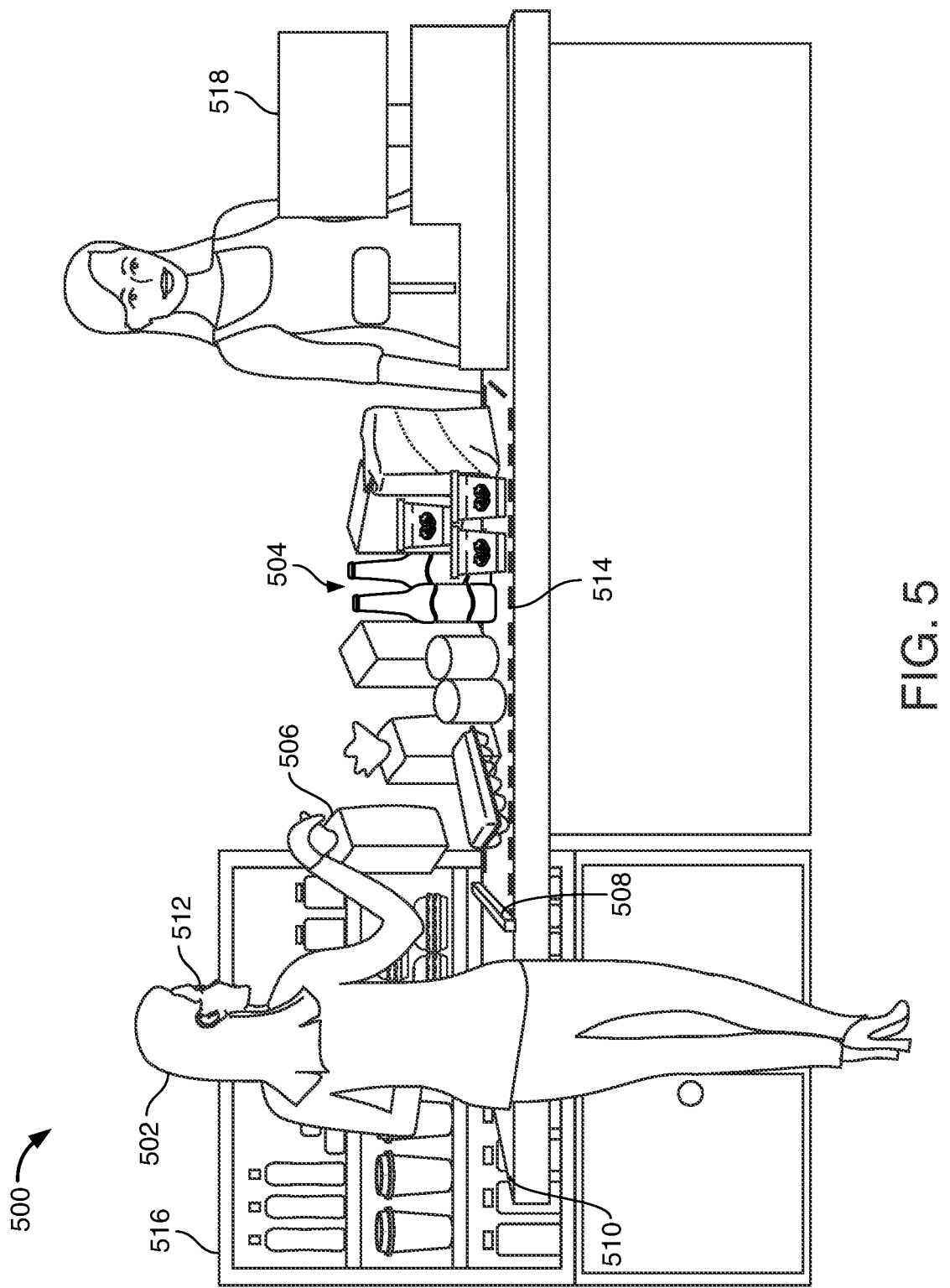
FIG. 5 shows an illustrative diagram in accordance with principles of the disclosure.

FIG. 5 shows an illustrative diagram 500 in accordance with principles of the disclosure. In FIG. 5 smart contact lens user 502 is shown standing at a checkout conveyor belt alongside a POS device. Smart contact lens user 502 is wearing smart contact lens 512.

In FIG. 5, smart contact lens 512 may be configured to detect the purchase products that smart contact lens user 502 is purchasing. Purchase products 504 may be detected prior to being scanned at the POS device. Additionally, smart contact lens 512 may be configured to identify and classify each of purchase products 504 detected and store the classification in a dataset.

Purchase products 504 are shown displayed on the checkout counter conveyor belt.

As smart contact lens user may be unloading purchase products 504 on the checkout conveyor belt, smart contact lens 512 may be configured to capture and identify each purchase product in real-time.

In some embodiments, smart contact lens user 502 places each purchase product on the checkout conveyor belt. Smart contact lens 512 is configured to detect objects that are within the bounded area 514. Each of the purchase products may be detected as it is being placed within bounded area 514. Each of the purchase products may be detected following a placing of the product within bounded area 514. Each of the purchase products, upon detection, may be classified and may further be tagged with a classifier identifier. Once the purchase product is tagged with a classifier identifier, the smart contact lens may not detect the purchase product twice.

The bounded area may be two-sided. The bounded area may be three-sided. The bounded area, in FIG. 5, may be shown at 514. Portable marker 508 may be the third side of the bounded area. Portable marker 508 may be the fourth side of the bounded area. The location where portable marker 508 is placed may define the end of the bounded area. In some embodiments, the third side of the bounded area may be shown at 510. 510 may be the end of the checkout counter conveyor belt. A fourth side of the bounded area may be the POS device 518.

In some embodiments, as smart contact lens user 502 is placing the purchase product on the checkout conveyor belt, smart contact lens 512 may be configured to detect purchase product 506 being in the hand of smart contact lens user 502 and detect the purchase product. The detection may be triggered in response to smart contact lens 512 detecting the user's hand and a purchase product within the user's hand.

It should be appreciated that items displayed on the shelves 516 in the checkout aisle, may be within surrounding areas 516 outside the bounded area. Smart contact lens 512 may be configured to black-out those items. Additionally, when smart contact lens user's field of view is outside the bounded area 514, smart contact lens 512 may be triggered not to detect purchase products.

Following a classification of each detected purchase product and an identification of the portable marker 508, may be a trigger for smart contact lens 512 to stop detecting objects. In some embodiments, smart contact lens user 502 may perform a hand gesture. The hand gesture may be the stop instruction to the smart contact lens 512.

Figure 6:
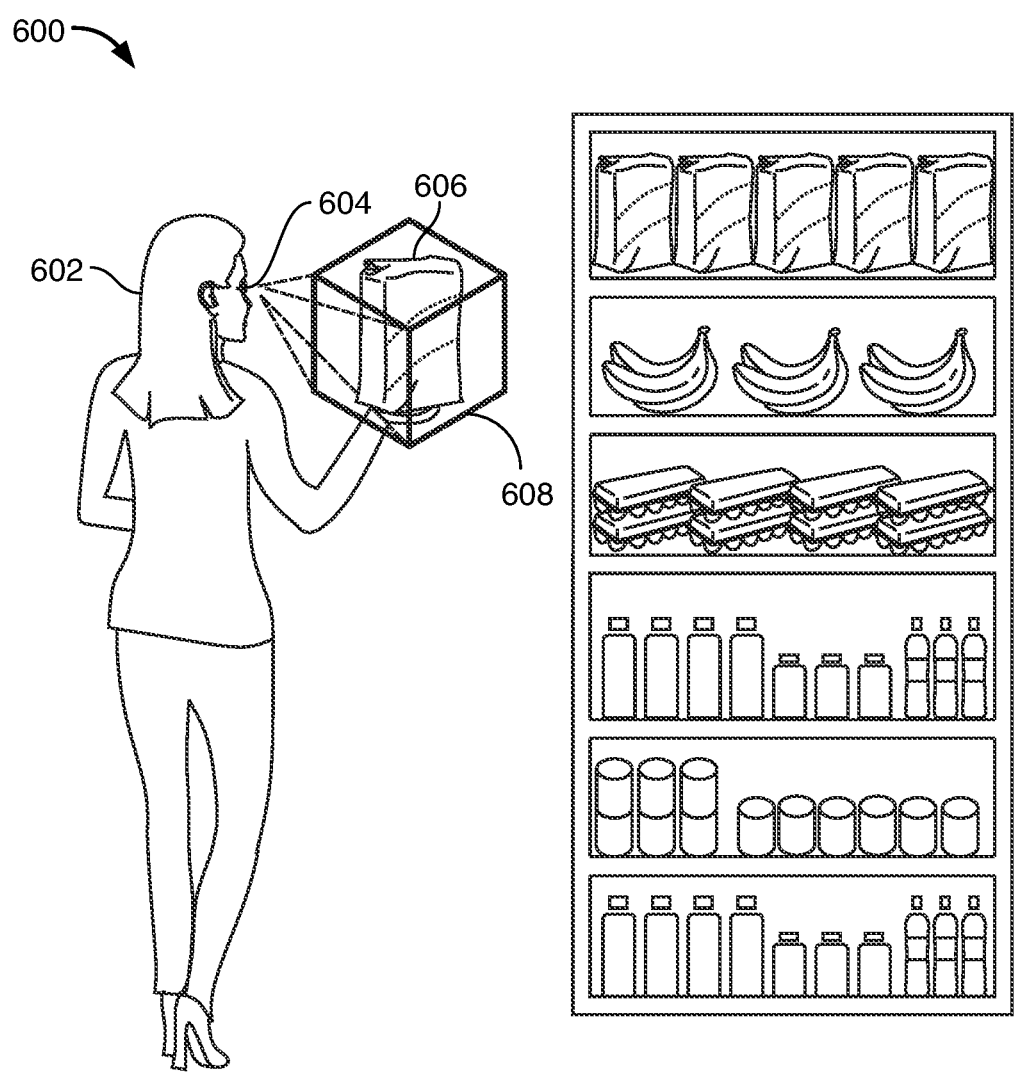
FIG. 6 shows an illustrative diagram in accordance with principles of the disclosure.

FIG. 6 shows an illustrative diagram 600 in accordance with principles of the disclosure. In FIG. 6 smart contact lens user 602 is leveraging the smart contact lens 604 to scan purchase product 606.

Smart contact lens 604 may be configured to detect a purchase product when an identification of the user's hand is within the field of view of the smart contact lens and the hand is grasping a purchase product.

Purchase product 606, in FIG. 6 may be shown in the hand of smart contact lens user 602. Smart contact lens 604 may be triggered to detect object 606 that may be within the field of view of smart contact lens 604. Object 606 may be detected within the three-dimensional view 608. Smart contact lens 604 may be configured to identify object 606 as a purchase product. Using object detection and image classification, smart contact lens 604 may identify the purchase product 606 as, for example, 'a bag of flour.' Smart contact lens 604 may store a classifier identifier for the 'bag of flour' and a name of the purchase product 606 in a dataset. In some embodiments, smart contact lens 604 may be enabled to retrieve a price of purchase product 606 and store the price alongside the classifier identifier.

Figure 7:
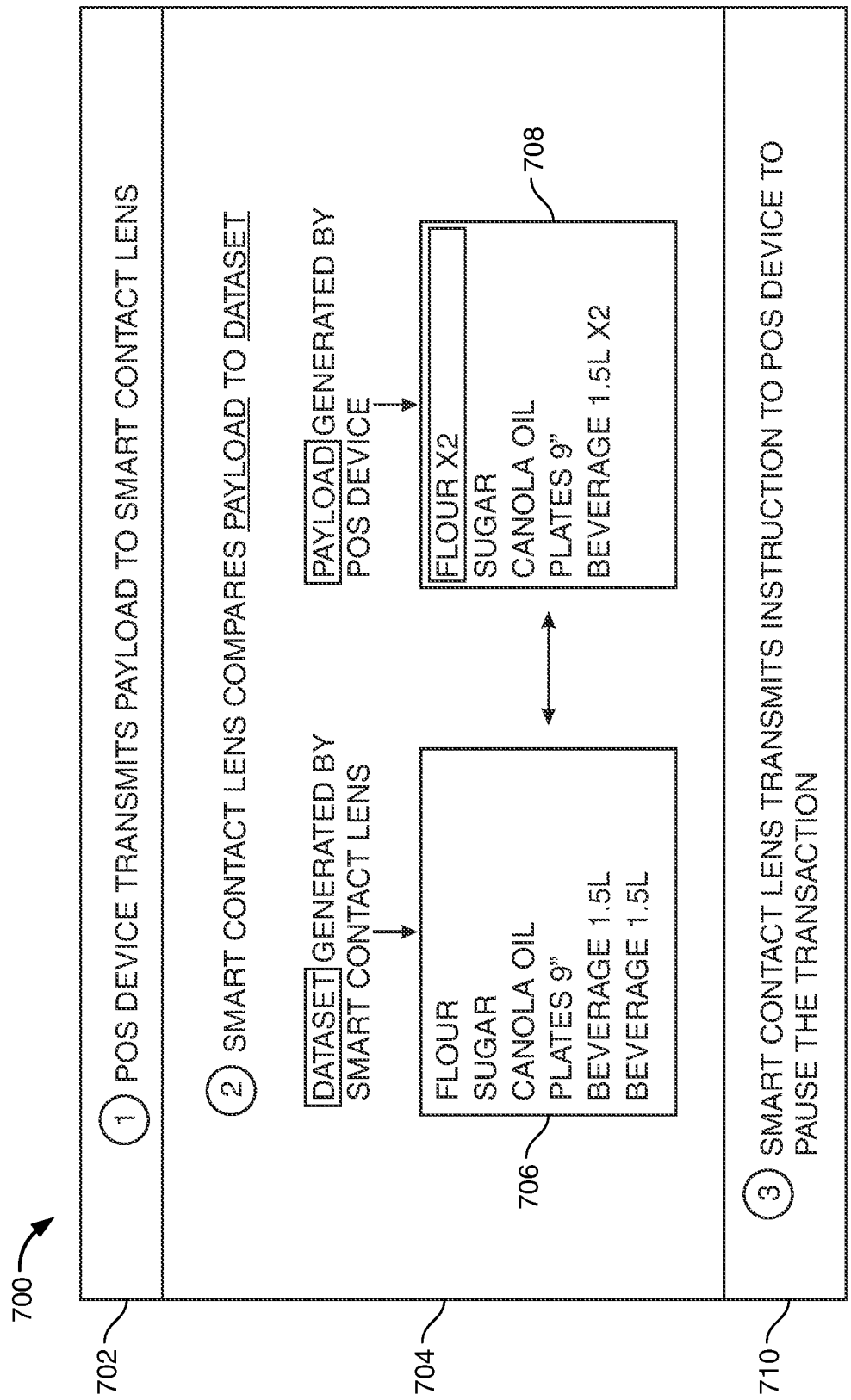
FIG. 7 shows an illustrative flow chart in accordance with principles of the disclosure.

FIG. 7 shows an illustrative flow diagram 700 in accordance with principles of the disclosure. In FIG. 7, smart contact lens is verifying an accuracy of a transaction prior to completing the transaction.

At 702, POS device is configured to transmit a payload generated at the POS device to the smart contact lens. The payload includes details associated with each purchase product scanned by the POS device.

At 704, smart contact lens is configured to receive the payload 708 and compare the payload to the dataset 706 generated by the smart contact lens. Dataset 706 is generated based on purchase products captured at the smart contact lens. Each purchase product captured is classified using an object detection algorithm and then stored in the dataset 706.

Smart contact lens identifies a discrepancy in the payload 708. 'Flour' is listed in both the dataset 706 and payload 708. However, at payload 708, 'Flour' is listed two times. In dataset 706, 'Flour' is listed once. This may indicate an inaccurate payload. The purchase product 'Flour' may have been scanned twice, while the user may only be purchasing one 'Flour.'

At 710, smart contact lens transmits an instruction to the POS device. The instruction may include instructing the POS device to pause the transaction. The discrepancy may be displayed at the GUI of the POS device. In some embodiments, the cashier at the POS device may be enabled to view the discrepancy and manually correct the discrepancy.

Thus, systems and methods using smart contact lens interactions for POS transaction validation is provided. Persons skilled in the art will appreciate that the present invention can be practiced by other than the described embodiments, which are presented for purposes of illustration rather than of limitation.

What is claimed is:

1. A system using smart contact lens interactions for point of sale ("POS") transaction validation, the system comprising:
   a smart contact lens configured to be positioned on an eye of a user, the smart contact lens comprising a micro camera, one or more sensors, a light fidelity ("Lifi") emitter, a Lifi receptor and a microprocessor;
   a POS device comprising a processor, a scanning device and a graphical user interface ("GUI") on a display of the POS device;
   an item verification application stored on the smart contact lens and executed by the microprocessor at the smart contact lens, the item verification application being configured to identify a hand grasping a purchase product, the hand being within a bounded area upon which purchase products are expected to be placed;
   in response to the identification of the hand grasping the purchase product within the bounded area:
      authenticate via the smart contact lens, that the hand grasping the purchase product is a hand of the user by authenticating biometric characteristics of the hand of the user based on biometric characteristics of the hand of the user stored at the smart contact lens;
      following authenticating that the hand grasping the purchase product is the hand of the user, and prior to receipt of a stop instruction, triggering a routine to identify at the smart contact lens, using an object detection algorithm running on the smart contact lens, each purchase product placed on the bounded area when each purchase product is grasped by the hand of the user wherein the identifying of each purchase product includes retrieving a product description associated with each purchase product; and store, on the smart contact lens, an identifier of each purchase product and the product description of each purchase product in a dataset;

a pairing application executed by the microprocessor on the smart contact lens configured to pair the smart contact lens to the POS device when the smart contact lens is within a pre-determined proximity to the POS device, the pairing enabling a secure wireless communication between the POS device and the smart contact lens;

a POS transaction payload application executed at the POS device configured to, following a scanning of each purchase product by the POS device:
compile a payload, the payload comprising a list of the purchase products, wherein each purchase product comprises a name of the purchase product; and
transmit the payload, via a Lifi emitter on the POS device, to the smart contact lens; and the microprocessor is configured to, in response to a receipt of the payload, execute the item verification application on the smart contact lens to verify an accuracy of the payload prior to completing a transaction, the verifying comprising:
determining if each purchase product included in the payload is identified in the dataset;
when the payload includes a purchase product not identified in the dataset, the microprocessor is configured to transmit a first instruction to the POS device to pause the transaction; and
when the payload includes each purchase product identified in the dataset, the microprocessor is configured to receive a second instruction to complete the transaction.

2. The system of claim 1 wherein the item verification application is configured to detect the trigger when a deliberate double eye blink gesture is performed by the user while focusing on the purchase products within the bounded area.

3. The system of claim 2 wherein the bounded area is within confines of a checkout counter conveyor belt.

4. The system of claim 1 wherein when the payload includes a purchase product not identified in the dataset, the microprocessor is further configured to:
instruct the display on the smart contact lens to trigger the augmented reality display of an alert message indicating an anomaly in the payload;
transmit the alert message, via the Lifi emitter on the smart contact lens, to the POS device; and
display the alert message on the GUI at the POS device.

5. The system of claim 1 wherein the stop instruction is received in response to a wave gesture by the hand of the user.

6. The system of claim 1 wherein the stop instruction is received when an identification of a portable marker is identified within the bounded area.

7. The system of claim 1 wherein the stop instruction is received when activity is not detected for a pre-determined amount of time within the bounded area.

8. The system of claim 1 wherein the object detection algorithm is a Self-Attention Generative Adversarial Network ("SA GAN").

9. The system of claim 1 wherein when the smart contact lens is within the pre-determined proximity to the POS device, the pairing comprises:
generating a token via the pairing application, the token derived from a biometric profile of the user stored on the smart contact lens;
transmitting the token, via the Lifi emitter on the smart contact lens, to the POS device;
displaying on the GUI, via a processor of the POS device, profile data of the user based on the token and a selectable option button wherein upon selection enables a pairing of the smart contact lens to the POS device;
selecting at the POS device, the selectable option button; and
following the selecting, pairing the smart contact lens to the POS device.

10. A method for point of sale ("POS") transaction validation, the transaction validation leveraging a smart contact lens positioned on an eye of a user, the method comprising:
pairing the smart contact lens to a POS device when the smart contact lens is within a pre-determined proximity to the POS device;
identifying, by the smart contact lens, a bounded area upon which purchase items are expected to be placed;
identifying, within the bounded area, a hand grasping a purchase product;
authenticating, via the smart contact lens that the hand grasping the purchase product is a hand of the user by authenticating biometric characteristics of the hand of the user based on biometric characteristics of the hand of the user stored at the smart contact lens;
following authenticating that the hand grasping the purchase product is the hand of the user, and prior to a receipt of a stop instruction:
identifying by the smart contact lens, using an object detection algorithm, each purchase product placed on the bounded area, when each purchase product is grasped by the hand of the user, wherein the identifying of each purchase product includes retrieving a product description associated with each purchase product; and
storing, on the smart contact lens, an identifier of each purchase product and the product description of each purchase product in a dataset;
receiving, at the smart contact lens, a payload from the POS device, the payload including a list of purchase products, the purchase products scanned for purchase at the POS device, wherein for each purchase product, the list includes a name of the purchase product and a brand of the purchase product; and
in response to a receipt of the payload, verifying, at the smart contact lens, an accuracy of the payload prior to completing a transaction, the verifying comprising:
determining, by the smart contact lens, if each purchase product included in the payload is identified in the dataset;
when the payload includes a purchase product not identified in the dataset, transmitting a first instruction to the POS device instructing the POS device to pause the transaction; and
when the payload includes each purchase product identified in the dataset, transmitting a second instruction to the POS device instructing the POS device to complete the transaction.

11. The method of claim 10 wherein, when the payload includes each purchase product identified in the dataset, the method further comprises:

triggering an augmented reality display on the smart contact lens to display a selectable option button to initiate a transaction;

detecting a selection of the selected option button; and transmitting the second instruction to the POS device instructing the POS device to complete the transaction.

12. The method of claim 10 wherein prior to transmitting the second instruction, the method comprises:

searching on a web application associated with a merchant of the POS device, for electronic coupons associated with the purchase products, via the smart contact lens; and upon identification of one or more electronic coupons associated with one or more purchase products, transmitting the electronic coupons to the POS device for processing.

13. A system using smart contact lens interactions for processing a transaction, the system comprising:

a smart contact lens configured to be positioned on an eye of a user, the smart contact lens comprising a micro camera, one or more sensors, a light fidelity ("Lifi") emitter, a Lifi receptor and a microprocessor;

a POS device comprising a processor, scanning device and a graphical user interface ("GUI") on a display of the POS device;

an item verification application stored on the smart contact lens and executed by the microprocessor at the smart contact lens configured to identify a hand grasping a purchase product, the hand being within a bounded area in which purchase products are expected to be temporarily located, the bounded area having a length, width and depth, and upon identification of the hand grasping the purchase product within the bounded area, the item verification application is configured to:

authenticate, via the smart contact lens, that the hand grasping the purchase product is a hand of the user by authenticating biometric characteristics of the hand of the user based on biometric characteristics of the hand of the user stored at the smart contact lens;

following authenticating that the hand grasping the purchase product is the hand of the user, and prior to receipt of a stop instruction, triggering a routine to identify at the smart contact lens, using an object detection algorithm executed on the smart contact lens, each purchase product when each purchase product is within the bounded area when each purchase product is grasped by the hand of the user, wherein the identifying of each purchase product includes retrieving a product description associated with each purchase product; and store, on the smart contact lens, an identifier of each purchase product and the product description of each purchase product in a dataset;

a pairing application executed by the microprocessor on the smart contact lens configured to pair the smart contact lens to the POS device when the smart contact lens is within a pre-determined proximity to the POS device, the pairing enabling a secure wireless communication between the POS device and the smart contact lens;

the microprocessor, in response to the pairing, is configured to transmit the dataset from the smart contact lens to the POS device; and the POS device configured to, upon receipt of the dataset:

process the dataset by tagging each purchase product with a cost of the purchase product;

generate an invoice based on the cost tagged to each purchase product; and transmit an instruction to the smart contact lens requesting a receipt of a confirmation to complete the transaction.

14. The system of claim 13 wherein the item verification application is further configured to:

retrieve the cost of each purchase product from a database associated with a merchant, the merchant being associated with the POS device; and store the cost of each purchase product in the dataset.

15. The system of claim 14 wherein, upon receipt of the dataset, the POS device is configured to automatically generate the invoice.

16. The system of claim 13 wherein the bounded area is a hand of the user of the smart contact lens and the system is configured to, when the user is grasping a purchase product and the purchase product is within a visual field of view of the user, detect the purchase product.

* * * * *